United States Patent
Meyerhoff et al.

(10) Patent No.: US 11,988,542 B2
(45) Date of Patent: May 21, 2024

(54) FILLING LEVEL MONITORING DEVICE FOR A FLUID GAS CONTAINER, HYDROGEN TANK AND AIRCRAFT COMPRISING SUCH HYDROGEN TANK

(71) Applicants: AIRBUS (S.A.S.), Blagnac (FR); Airbus Operations GmbH, Hamburg (DE); Carthage College, Kenosha, WI (US)

(72) Inventors: Thomas Meyerhoff, Taufkirchen (DE); Helge Geisler, Hamburg (DE); Lionel Zoghaib, Blagnac (FR); Gerrit Schramm, Taufkirchen (DE); Kevin Crosby, Kenosha, WI (US)

(73) Assignees: Airbus (S.A.S.), Blagnac (FR); Airbus Operations GmbH, Hamburg (DE); Carthage College, Kenosha, WI (US)

( * ) Notice: Subject to any disclaimer, the term of this patent is extended or adjusted under 35 U.S.C. 154(b) by 161 days.

(21) Appl. No.: 17/744,201

(22) Filed: May 13, 2022

(65) Prior Publication Data
US 2023/0366720 A1   Nov. 16, 2023

(51) Int. Cl.
   *G01F 23/296* (2022.01)
(52) U.S. Cl.
   CPC .................. *G01F 23/2966* (2013.01)
(58) Field of Classification Search
   CPC ................................................. G01F 23/2966
   See application file for complete search history.

(56) References Cited

U.S. PATENT DOCUMENTS

| | | | | |
|---|---|---|---|---|
| 5,261,274 A | * | 11/1993 | Nemirow | G01F 17/00 324/668 |
| 5,528,933 A | * | 6/1996 | Nemirow | G01F 17/00 73/579 |
| 6,157,894 A | * | 12/2000 | Hess | G01F 23/18 702/50 |
| 7,114,390 B2 | * | 10/2006 | Lizon | G01F 23/2966 73/290 R |
| 7,578,183 B2 | * | 8/2009 | Young | G01F 17/00 73/579 |

(Continued)

FOREIGN PATENT DOCUMENTS

FR        3042268 A1 *  4/2017

*Primary Examiner* — John Fitzgerald
(74) *Attorney, Agent, or Firm* — KDW Firm PLLC

(57) ABSTRACT

A filling level monitoring device for monitoring a filling level of a fluid in a container includes exciter(s), sensor(s), a signal source connected to the exciter(s), a processor, at least one spatial orientation and acceleration sensor, and a filling level indicator. The device uses the signal source and the exciter(s) to couple vibrational loads having multiple frequency components into the container. Sensors measure vibrations in the container after the exciters transmit the vibrational loads into the container. The processor performs spectral analysis of the input signal and of vibration signals from the sensors, comparing these respective spectral functions to extract resonance frequencies of the container, which are based on the spatial orientation of the container. The filling level indicator calculates a current filling level of the container from the extracted resonance frequencies and a spatial orientation signal from a spatial orientation sensor by correlating the collected data with reference data.

17 Claims, 2 Drawing Sheets

(56) References Cited

U.S. PATENT DOCUMENTS

| | | | | |
|---|---|---|---|---|
| 7,739,909 | B2* | 6/2010 | Heise | F17C 13/02 |
| | | | | 73/290 R |
| 7,843,355 | B2* | 11/2010 | Davis | G01F 25/0084 |
| | | | | 340/612 |
| 9,829,363 | B2* | 11/2017 | Young | G01F 23/2966 |
| 10,562,071 | B2 | 2/2020 | Werlink | |
| 10,745,263 | B2* | 8/2020 | Crouse | F17C 1/04 |
| 10,928,238 | B2* | 2/2021 | Young | G01F 22/00 |
| 11,771,261 | B2* | 10/2023 | Alexander | A47J 27/21083 |
| | | | | 99/483 |
| 2018/0044159 | A1* | 2/2018 | Crouse | F17C 13/02 |
| 2018/0238728 | A1* | 8/2018 | Young | G01F 23/2966 |
| 2019/0162573 | A1* | 5/2019 | Zahn | G01F 23/80 |
| 2022/0091156 | A1* | 3/2022 | Rojas | G01F 23/284 |

\* cited by examiner

FILLING LEVEL MONITORING DEVICE FOR A FLUID GAS CONTAINER, HYDROGEN TANK AND AIRCRAFT COMPRISING SUCH HYDROGEN TANK

TECHNICAL FIELD

The disclosure herein relates to filling level monitoring devices for fluid tanks and, in particular, to hydrogen tanks for aircraft applications having such a monitoring device.

BACKGROUND

In light of increasing environmental protection efforts, alternative propulsion sources for aircrafts are developed. Such alternative propulsion sources may use alternative fuels other than kerosene fuel, such as liquid hydrogen, which cannot be stored in conventional fuel tanks. Hydrogen fuel or other liquid gas fuels therefore need to be stored in suitable tanks, which must, for example, withstand the necessary internal pressure and low temperature (e.g., about 20K) required to store the gaseous fuel in a liquid state. However, for safety reasons, it is also necessary to monitor the filling level of the fuel tanks accurately at any time (e.g., in real-time), regardless of the fuel type contained in such fuel tanks. Currently, filling levels of fluid tanks can, for example, be determined by measuring the weight of the tank or indirectly by monitoring the flow of the fuel out of the tank. However, these methods are either not very accurate or may not be suitable for use in aircraft applications. An aircraft may, for example, experience changes in altitude and, during such ascent or descent flight segments of the aircraft, the gravity vector may not be constant with regard to the fuel tank, leading to difficulties in determining an accurate weight value of the fuel tank and, therefore, an accurate filling level of the fuel tank. The same applies for curved (e.g., nonlinear) flight segments in which the aircraft changes its flight vector.

SUMMARY

It is an objective to provide accurate monitoring of fuel levels of fluid tanks in aircraft applications.

This objective is solved by the subject matter disclosed herein.

According to a first aspect, a filling level monitoring device for monitoring the filling level of a container for fluid is provided. The filling level monitoring device comprises at least one exciter, at least one sensor, a signal source, a processor, at least one spatial orientation and acceleration sensor and a filling level indicator. The at least one spatial orientation and acceleration sensor is connected to the processor and is configured to measure a spatial orientation of the fluid inside the container. The signal source is connected to the at least one exciter and is configured to generate an input signal comprising a multitude of frequency components. The at least one sensor is connected to the processor and is configured to sense vibrations at the container and to generate and send a corresponding vibration signal to the processor. The processor is configured to compare the vibration signal to the input signal to extract resonance frequencies. The filling level indicator is configured to receive the extracted resonance frequencies from the processor and to receive a spatial orientation of the fluid inside the container from the at least one spatial orientation and acceleration sensor. The filling level indicator is configured to determine a current filling level of the fluid inside the container based on the extracted resonance frequencies and the spatial orientation of the container.

Such a filling level monitoring device may be used for any container for liquid, such as for gas bottles or containers for hydrogen. However, the filling level monitoring device is not limited to hydrogen containers. It may, for example, also be used with containers for liquified petroleum gas (LPG), methane gas or any other fluid that is stored under pressure in a liquified form. Further, the filling level monitoring device may be used for regular liquid tanks. In general, as used herein, the term fluid covers liquids (such as pressurized gasses in liquid form), mixtures of liquids and gases, i.e., fillings of the container where a filling of the container is present in both phase states (liquid and gas) simultaneously, as well as pure gases.

In general, as any other tangible structure, under force-based excitation, a container for storing a fluid exhibits a characteristic vibration or oscillation pattern, where the amplitudes of the oscillations or vibrations in specific frequency ranges show a relative maximum. While some of these so-called resonance frequencies depend only on the structure of the container itself and are independent of the filling of the container, other can be clearly assigned to the stored contents. In particular, a liquified gas filling such as liquid hydrogen changes specific resonance frequencies of the container, where the change in frequency is proportional to the filling level, i.e., to the change of the mass and/or volume of the filling, of the container. Hence, by monitoring resonance frequencies of the container, the filling level of the container may be accurately determined.

The container may, for example, be the component of a tank that is actually holding the (fluid) content of the tank, such as a pressure tight gas bottle or other suitable structures. In particular, the container may have an axial symmetric form, though other forms are conceivable, too.

The signal source, or rather an output terminal of the signal source, is connected to the at least one exciter and generates electrical signals (e.g., the input signals for the exciters) having a predefined signal pattern. In particular, the signal source generates electrical signals that cover a multitude of different frequencies in the range of the respective resonance frequencies that respond with a frequency change at any possible filling level of the container. As described above, certain resonance frequencies of the filled container depend on the filling level of the container. Therefore, each filling level of the container has a characteristic pattern of resonance frequencies which directly corresponds to the respective filling level and which may also depend on the spatial orientation of the fluid inside the tank. The signal source may, for example, output a signal having an evenly distributed spectral distribution, such as a white noise signal. However, other signal shapes covering the respective frequencies are possible, too.

The at least one exciter may be any element or device suitable for mechanically exciting the container, i.e., to bring the container to vibrate or oscillate. In particular, the exciter may be directly attached to the container and may be configured to vibrate in response to an electrical signal applied to the exciter. However, the exciter does not necessarily need to be attached directly to the container and may, for example, also be a loudspeaker or similar device that emits acoustic waves. In such configurations, the emitting direction of the speaker may be directed towards the container, so that the emitted acoustic waves coupled into the container mechanically excite the container. Further, as described further below, instead of additional exciters, aircraft noise originating from turbines, pumps, etc. may also be directly coupled into the container and therefore act as exciter. Since the at least one exciter is connected to the output terminal of the signal source, the electrical signal output by the signal source (e.g., the input signal for the exciters) is converted into respective mechanical vibrations or oscillations which are coupled into the container by the at least one exciter. As will be readily apparent to one of ordinary skill in the art, frequency components of the input signal which correspond to resonance frequencies of the container, or rather of the system of the container and the filling, at a given time show a relative amplitude maximum of the oscillations or vibrations of the container while other frequency components are not.

The at least one sensor may be any sensing or sensor element which is suitable to detect vibrations or oscillation of the container (or in general to detect the structural dynamics of the container or changes in the container wall's physical properties which can be used to be correlated to changes of the containers dynamics) and to generate respective electrical signals, in particular signals comprising frequency components of the oscillation or vibration pattern of the container. These signals are input into a processor.

The at least one spatial orientation and acceleration sensor may be any sensor or sensor array that is capable of detecting the spatial orientation of the fluid inside the container. Such sensors or sensor arrays may, in particular, determine the orientation of the fluid inside the container with regard to any suitable coordinate system. In aircraft applications, for example, the spatial orientation and acceleration sensor(s) may determine the orientation of the fluid inside the container with regard to the yaw, pitch and roll axis of the aircraft. The spatial orientation and acceleration sensor(s) may be directly attached to the container or, may be, for example, part of a surrounding structure, such as an aircraft. Specifically, instead of a separate spatial orientation and acceleration sensor attached to the container, the signals of yaw, pitch and roll axis sensors already present in the aircraft may be used to determine the orientation of the fluid inside the container based on the orientation of the surrounding structure based on the determined orientation of the surrounding structure and the known relative orientation of the container with regard to the surrounding structure.

Further, acceleration data of the aircraft, for example about forces introduced by tight curves or other aerial maneuvers of the aircraft, obtained from the at least one spatial orientation and acceleration sensor, may be considered. The corresponding forces also lead to a changing distribution of the fluid within the container and therefore to a change of the resonance frequency pattern.

In general, the resonance frequencies of the filled container may depend on the orientation of the fluid inside the container with regard to the gravity and aircraft acceleration vectors because the fluid within the container is stored with different orientations with regard to the container if the container is differently oriented with regard to these vectors. In general, depending on which areas of the inner walls of the container are in contact with the fluid, the resonance frequencies of the filled container change. This leads to changes or shifts of the resonance frequency, when the orientation of the fluid within the container changes. Therefore, in particular, the measurement signals of single sensors attached at different locations on the container change with changing orientation of the fluid within the container. Further, resonance frequencies which did not show a shift at one orientation of the container may show a shift at a different orientation of the container and vice versa. Hence, different resonance frequency patterns may occur, for example, in different flight orientations of an aircraft and with different acceleration states of the aircraft. This is a result of the fluid aligning within the container with regard to the superposition of all forces acting onto the aircraft, in particular introduced by gravity and by accelerations of the aircraft. As the aircraft ascends or descends, for example, the pitch angle of the container with regard to the gravity vector changes, leading to shifts of the fluid and therefore to shifts in the resonance frequencies, as oscillations propagate differently within the fluid in the container. Further, acceleration data of the aircraft, as described above, may also be utilized. Specifically, different orientations of the fluid inside the container lead to different resonance modes because of a change of the structural dynamics of the container caused by different distributions of the fluid within the container. By using one or more spatial orientation and acceleration sensors (possibly together with sensor data from, for example, acceleration sensors of the aircraft), these effects can be taken into account when determining the filling level of the container, as will be described further below.

Further, the temperature of the container may be taken into account when determining the filling level, since with changing temperature, the pressure inside the container changes. This may also lead to changes in the resonance frequencies of the container. The temperature of the container may be accounted for in the same way as the accelerations, for example, by being included into corresponding reference data or machine learning algorithms, as described below. Alternatively or additionally to taking into account the temperature, the pressure inside the tank may be directly used. The filling level monitoring system therefore may further include corresponding temperature and/or pressure sensors.

The processor and the filling level indicator may both be any computerized device capable of analyzing electrical signals, in particular by performing a spectral or modal analysis. The units may, for example, be general-purpose computers having a CPU and memory components, which are well known in the art. The units may also be any other microcomputer device, such as an ASIC or FPGA or TPU device. The processor receives the output signal, i.e., the vibration signal, from the at least one sensor and performs data analysis algorithms for computing the frequency components of the signal received from the at least one sensor. Further, the processor receives and analyzes the input signal from the signal source, to compute the frequency components included in the input signal.

However, instead of directly using the input signal, a sensor signal from corresponding feedback sensors at the exciters may be used. The frequency components of the input signal and the vibration signal may, for example, be determined by performing a Fast Fourier Transform (FFT) algorithm or any other spectral analysis algorithm on the input signal and the vibration signal, thereby creating corresponding spectral functions indicating the signal components over the frequency. The spectral functions of the vibration signal and the input signal may then be compared in order to determine or extract the actual resonance frequencies of the container, thereby generating extracted resonance frequencies. Such comparison may, for example, be achieved by computing a frequency response function (FRF), as will be described further below. Since the signal components having a resonance frequency of the container are amplified (as described above), while other signal components are not amplified or even damped, by comparing the spectral functions of the vibration signal and the input signal, these resonance frequencies (or a resonance frequency pattern) can be estimated. The extracted resonance frequencies or resonance frequency pattern are then passed to the filling level indicator.

The filling level indicator receives the extracted resonance frequencies from the processor and a current spatial orientation of the fluid inside the container from the at least one spatial orientation and acceleration sensor. As described above, the spatial orientation of the fluid inside the container influences the resonance frequencies for certain filling levels. Therefore, the filling level indicator takes the spatial orientation and acceleration of the container into account when determining the actual filling level of the container. For example, the filling level indicator may have a stored lookup table of resonance frequencies or resonance frequency patterns for every possible spatial orientation of the fluid inside the container (or for a subset of interest of such possible positions). Further, the filling level indicator may have a stored lookup table of resonance frequencies or resonance frequency patterns for every possible temperature and/or pressure of the container, if temperature and/or pressure data are taken into account, too. The actual filling level of the container may then be determined, for example, by correlating or matching the extracted resonance frequencies with the stored reference resonance frequency pattern. However, the filling level indicator may also not use such a lookup table but rather calculate the corresponding reference resonance frequency patterns by using a mathematical model of the structural dynamics of the container and correlating or matching the extracted resonance frequencies with this modeled reference resonance frequency pattern. For this, for example a machine learning algorithm may be utilized that takes into account the necessary parameters, such as spatial orientations and accelerations and optionally temperature and/or pressure, etc.

Although the processor and the filling level indicator are described as being two independent units, it should be noted that those units may also be embodied as a common unit incorporating the functionalities of both units. Also, the at least one spatial orientation and acceleration sensor may also be connected to the processor and the processor may compute the reference resonance frequencies or reference resonance frequency pattern and pass those reference resonance frequencies to the filling level indicator. In such configurations, the filling level indicator only uses the extracted resonance frequencies and the reference resonance frequencies received from the processor to determine the actual filling level.

After determining the current filling level of the container, the filling level indicator may output a corresponding filling level signal which may, for example, be passed to an onboard-computer or other control and monitoring system.

According to an embodiment, the at least one spatial orientation and acceleration sensor includes a first sensor for measuring a pitch angle, a second sensor for measuring a yaw angle, a third sensor for measuring a roll angle of the container and a fourth sensor for measuring the accelerations along the pitch, yaw and roll axis. The spatial orientation is defined with regard to the pitch angle, the yaw angle and the roll angle.

Such spatial orientation and acceleration sensors may be particularly advantageous in aircraft applications, especially when such sensors are already present in the aircraft. Therefore, the signals of such sensors may be passed to the filling level monitoring device without the need to add additional sensors. However, the at least one spatial orientation and acceleration sensor may be any position sensor suitable to determine the relative orientation of the fluid inside the container with regard to the orientation of the container.

In addition, the filling level monitoring device may include acceleration sensors or may use corresponding sensor data from a surrounding structure, such as an aircraft, in order to account for resonance frequency changes introduced by accelerations, as described above. When using such acceleration sensors together with the spatial position sensors, the sensors measure six degrees of freedom, namely the spatial position with regard to each of the spatial axis as well as the corresponding accelerations for each of the axis. In particular, by including acceleration sensors, the superposition of gravity with such dynamic forces (such as the forces introduced by the acceleration) may be taken into account when evaluating the filling level of the container.

According to another embodiment, the at least one sensor is a device capable of measuring the dynamics of the container at the location of the sensor.

Such a device capable of measuring the dynamics of the container may be any device capable of detecting or measuring properties of the container that correspond to the structural dynamics of the container, such as vibrations or other suitable mechanical properties.

The device capable of measuring such properties may, for example, be a composite fiber strain gauge. Such a composite fiber strain gauge may consist of rectangular piezo ceramic rods sandwiched between layers of adhesive, electrodes, and polyimide film. The electrodes are attached to the film in an interdigitated pattern which transfers the applied voltage to and from the ribbon-shaped piezo ceramic rods. This assembly enables in-plane poling, actuation, and sensing in a sealed and durable, ready-to-use package. The composite fiber strain gauge can also be applied (normally bonded) as a thin, surface-conformable sheet to various types of structures, or embedded in a composite structure. If voltage is applied, it works as an actuator and will bend or distort materials, counteract vibrations, or generate vibrations. If no voltage is applied it can work as a very sensitive strain gauge, sensing deformations, noise, and vibrations. Therefore, when the container vibrates or oscillates, the small deformations of the container are sensed by the composite fiber strain gauge. Since the vibration of the container comprises certain frequency components, the output signal of the composite fiber strain gauge follows the frequency pattern of the vibrations.

According to another embodiment, the at least one exciter is configured to be attached to the container and to couple vibrational loads corresponding to the input signal from the signal source into the container.

For this, the at least one exciter may be any device capable of coupling vibrational loads or other mechanical loads into the container. As a non-limiting example, the exciter may be a piezoelectric element. Such piezoelectric elements are well known in the art. When a voltage is applied to such elements, they deform according to the electrical signal (inverse piezoelectric effect). Therefore, if a non-constant signal is applied, the piezoelectric elements start to vibrate according to the frequency components of the input signal, thereby coupling corresponding vibrational loads into the container. Such piezoelectric elements may, for example, be of the same kind as the composite fiber strain gauge described above with regard to the at least one sensor.

However, any other conceivable exciter may be used.

According to another embodiment, the signal source is configured to generate a signal suitable to obtain a frequency response function, FRF, in a desired frequency range as the input signal.

The signal thereby may be any signal that includes the frequency range necessary or desired for monitoring the resonance frequencies of the container that is suitable to obtain a frequency response function, as described further below.

As a non-limiting example, such a signal may be a white noise signal. As known in the art, such white noise signals are statistically random signals having an equal intensity at different frequencies. Therefore, when using such white noise signals as input signals, a broad range of equally distributed frequency components is coupled into the container, where only vibrations at the current resonance frequencies of the container show a relative maximum in amplitude. The input signal may also be limited to a certain input frequency range by using appropriate window functions, such as a gaussian window or a rectangular window.

However, any other input signal comprising the possible resonance frequencies of the container at different filling levels may be used.

According to another embodiment, the processor is configured to compare the vibration signal to the input signal by calculating Fast Fourier Transforms, FFTs, of the vibration signal and the input signal and by comparing the FFT of the vibration signal with the FFT of the input signal.

However, other spectral or modal analysis algorithms may be used to, as will be readily apparent to one of ordinary skill in the art.

According to another embodiment, the processor is configured to extract the resonance frequencies by calculating a frequency response function (FRF) of the vibration signal with regard to the input signal using the FFTs of the vibration signal and the input signal, thereby obtaining a pattern of resonance frequencies.

Such a frequency response function is defined as $$H(f) = \frac{V(f)}{I(f)}$$

where H(f) is the frequency response function indication the amplification of the amplitude of certain frequency components over frequency f, V(f) is the vibration signal over frequency and I(f) is the input signal over frequency. The functions V(f) and I(f) thereby correspond to spectral functions of the vibration signal and the input signal, such as those obtained by a FFT of the corresponding signals.

According to another embodiment, the filling level indicator is configured to determine the current filling level of the container based on the extracted resonance frequencies by correlating the obtained pattern of resonance frequencies with calibrated patterns of resonance frequencies.

Although described as being determined by correlating an obtained pattern of resonance frequencies with a calibrated pattern, determination of the filling level may also be performed by tracking a single resonance frequency (in particular a resonance frequency which shows a strong correlation with the filling level) over time. Such single resonance frequency may be proportional to the filling level for a given time.

Calibrated patterns may, for example, be determined by controlled emptying of the container in a laboratory or operational environment, thereby determining resonance frequency patterns of the container for different filling levels and different spatial orientations. The resonance frequencies determined in this way may, for example, be stored in a matrix, which may be one or multi-dimensional. For example, such a matrix could be 4-dimensional when three spatial orientation sensors (e.g., for yaw, pitch and roll) are used. One dimension of the matrix could, for example, correspond to the filling level, the second dimension could correspond to yaw, the third dimension could correspond to pitch and the fourth dimension could correspond to roll. In operation, the filling level of the container may then be determined by correlating the extracted reference frequencies with the corresponding matrix elements, taking into account the estimated spatial orientation of the fluid inside the container.

According to another embodiment, the filling level monitoring device is configured to determine the current filling level of the container based on the extracted resonance frequencies or FRFs by machine learning and artificial intelligence methods trained with calibrated patterns of resonance frequencies or FRFs using the obtained pattern of resonance frequencies or FRFs as input.

According to another embodiment, the calibrated patterns of resonance frequencies or FRFs comprise calibrated patterns of resonance frequencies or FRFs for different spatial orientations of the fluid inside the container. The filling level indicator is configured to be trained by machine learning and artificial intelligence methods with calibrated patterns of resonance frequencies or FRFs and the obtained pattern of resonance frequencies or FRF as input to select calibrated patterns of resonance frequencies corresponding to a current spatial orientation of the fluid inside the container prior to determining the current filling level of the container.

According to another embodiment, the calibrated patterns of resonance frequencies comprise calibrated patterns of resonance frequencies for different spatial orientations of the fluid inside the container and the filling level indicator is configured to select calibrated patterns of resonance frequencies corresponding to a current spatial orientation of the fluid inside the container prior to determining the current filling level of the container.

However, instead of utilizing stored reference data (such as the calibrated patterns), the corresponding reference data may also be calculated "on-the-fly" by using a computer model of the structural dynamics of the container or other means. For example, the selected modes may be tracked over time or algorithms based on artificial intelligence, such as machine learning algorithms may be used.

According to a second aspect, a hydrogen tank is provided. The hydrogen tank comprises a container for holding liquified hydrogen and a filling level monitoring device.

The filling level monitoring device may be embodied according to any one of the embodiments described above and is configured to monitor the filling level of the container of the hydrogen tank according to the principles described above.

According to a third aspect, an aircraft is provided. The aircraft comprises an aircraft fuselage, an aircraft turbine and a hydrogen tank. The hydrogen tank is fixed in position with respect to the aircraft fuselage. The at least one spatial orientation and acceleration sensor is a spatial orientation and acceleration sensor of the aircraft itself.

Such an aircraft may use hydrogen as an alternative fuel, i.e., the turbine may be driven using hydrogen as an energy source. The hydrogen may be used as a primary energy source, for example, by burning the hydrogen directly within the turbine, or as a secondary energy source, for example, by producing electrical energy with a hydrogen fuel cell and powering the turbine by the electrical energy created in this way.

The filling level monitoring device according to the present disclosure enables accurate monitoring of the filling level of the hydrogen tank under any flight conditions. By fixing the hydrogen tank with regard to the fuselage, the spatial orientation and acceleration sensors of the aircraft, such as the pitch, yaw and roll axis sensors may be used to determine the spatial orientation of the liquid hydrogen inside the tank relative to the orientation of the tank. The container of the hydrogen tank may, for example, be positioned within the fuselage such that a longitudinal axis of the container coincides with a longitudinal axis of the fuselage. In this way, a pitch movement of the aircraft corresponds to a "pitch" movement of the container, and so on. Therefore, the coordinate system of the aircraft may be directly used for the container.

According to an embodiment, the filling level monitoring device is configured to monitor the hydrogen filling level of the container.

In particular, the filling level monitoring device may constantly monitor the filling level during flight and report corresponding filling levels to the pilot.

According to an embodiment, a source of vibrations on board the aircraft suitable to excite the container in the desired frequency range is the signal source of the filling level monitoring device.

Such a source of vibrations may be any vibration source on board the aircraft. The vibrations of such a vibrations source may be coupled into the container and may function as an excitation source for the filling level monitoring device.

According to another embodiment, the source of vibrations on board the aircraft is the aircraft turbine.

During operation, an aircraft turbine creates certain frequency components, either in the form of vibrations or in the form of electromagnetic noise. These noise or vibration signals may cover a frequency range wide enough to cover the resonance frequency range of a container of the hydrogen tank for different fuel levels, so that no additional signal source may be required. Instead, the vibrations of the turbine may be directly coupled into the container, or the electromagnetic noise may be captured, for example, by using antennas or other signal capture technique(s) and send to the at least one exciter. In the first case, no additional exciters and no additional signal source may be required. In the second case, only exciters but no additional signal source may be required. However, it should be noted that the aircraft turbine is only one example of a vibration source that may be employed for the filling level monitoring system and any vibration source within the aircraft may be used as an excitation source for determining the filling level of the container. Therefore, the vibration source is not limited to the aircraft turbine.

In summary, the present disclosure provides an accurate monitoring system to keep track of the filling level of a fluid tank, such as a liquid hydrogen tank. Because of the changing flight conditions in an aircraft (and the cryogenic nature of LiH2), conventional filling level monitoring techniques, such as by measuring the fluid flow out of the tank or by determining the weight of the tank, are inherently inaccurate. These inaccuracies can be avoided by measuring the filling level of a fluid tank by monitoring filling level dependent resonance frequencies of the tank, and, in particular, by also taking into account the spatial orientation of the fluid inside the tank during changing flight conditions, such as ascend or descend flight. Therefore, the present disclosure enables a more accurate and non-intrusive monitoring of the filling level of fluid tanks in general, and, in particular, in aircraft applications, thereby increasing security of aircrafts using alternative fuels such as hydrogen.

Although the present disclosure is described with regard to aircraft applications, it should be noted that the disclosure may be used for any suitable application, such as for automotive and similar applications.

BRIEF DESCRIPTION OF THE DRAWINGS

In the following, example embodiments are described in more detail having regard to the attached figures. The illustrations are schematic and not to scale. Identical reference signs refer to identical or similar elements.

DETAILED DESCRIPTION

Figure 1:
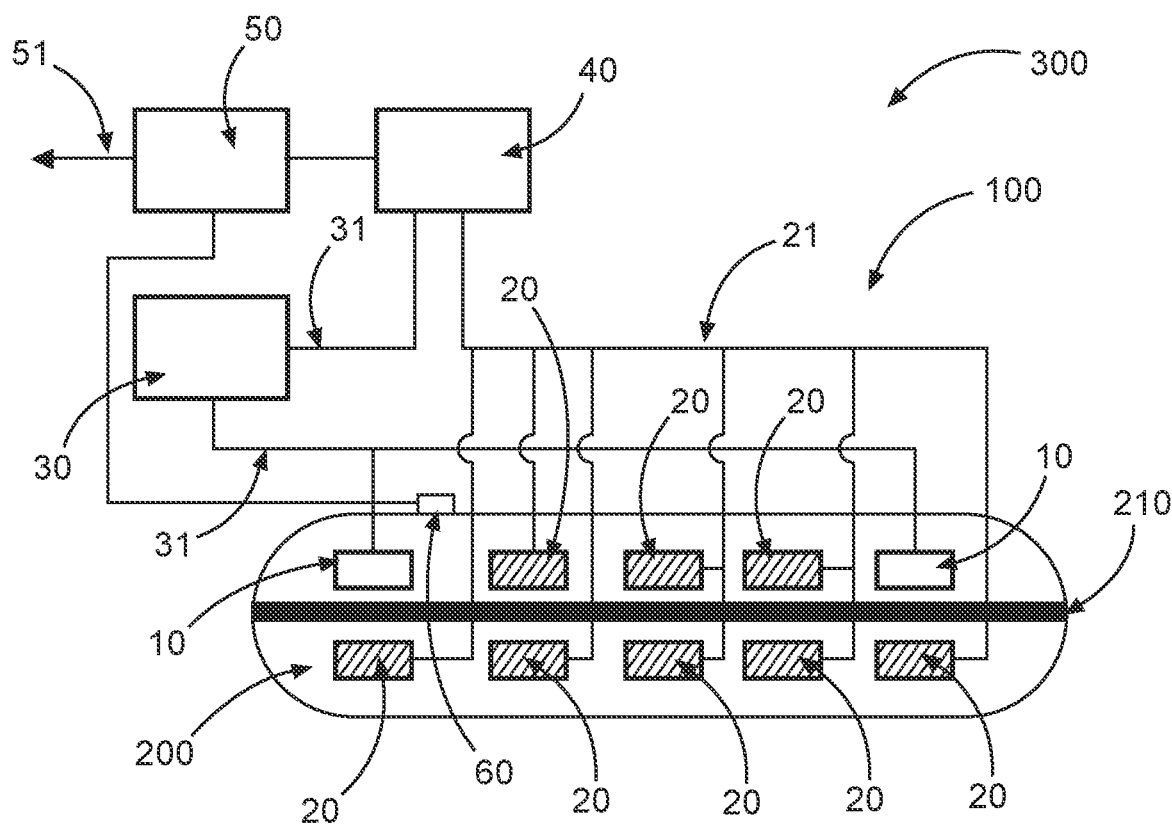
FIG. 1 is a schematic overview of a hydrogen tank having a filling level monitoring device.

FIG. 1 schematically shows an example embodiment of a liquid hydrogen tank, generally designated 300. The hydrogen tank 300 comprises a container, generally designated 200, and a filling level monitoring device, generally designated 100. In the depicted configuration, the filling level monitoring device 100 comprises one or more (e.g., two, or a plurality of) exciters 10 and one or more (e.g., eight, or a plurality of) sensors 20. The filling level monitoring device 100 also comprises a signal source 30, a processor 40, a filling level indicator 50, and a spatial orientation and acceleration sensor 60. The exciters 10 are electrically connected to the signal source 30. The processor 40 is electrically connected to the filling level indicator 50. The signal source 30 is electrically connected to the processor 40, the sensors 20 are electrically connected to the processor 40, and the spatial orientation and acceleration sensor 60 is electrically connected to the filling level indicator 50.

The container 200 contains therein liquid hydrogen, a filling level of the liquid hydrogen being schematically shown by the filling level 210. The container 200 is a pressure tight gas vessel configured to hold a pressurized liquified hydrogen gas.

As described elsewhere herein, the signal source 30 may be any signal source generating electrical signals covering a multitude of frequency components. The frequency range over which the signal source 30 can generate one or more input signals spans possible resonance frequencies of the container 200 at different filling levels 210. This frequency span of resonance frequencies of the container 200 based on the filling level 210 of the liquified hydrogen therein may, for example, be determined by computer simulations of the structural dynamics of the container 200. The frequency span may also be determined beforehand in a laboratory environment, as will be readily apparent. In the depicted configuration, the signal source 30 is a gaussian white noise signal source 30 configured to generate a wide range of frequency components which are equally distributed.

The container 200 has various resonance frequencies, some of which are only correlated to the structural dynamics of the container 200 itself, while others are dependent on the filling level 210. In particular, some of the resonance frequencies are proportional to the filling level 210 of the container 200 and shift when the filling level 210 within the container 200 changes. Therefore, by monitoring for shifts in the resonance frequencies of the container 200, the filling level 210 of the container 200 may be accurately determined.

The gaussian white noise signal source 30 is configured to generate corresponding electrical signals or input signals 31 that are transmitted to the exciters 10. The exciters 10 may be any element or device capable of generating mechanical oscillations or vibrations. In the depicted configuration, for example, the exciters 10 are piezoelectric elements, which are directly attached to the container 200 and employ the inverse piezoelectric effect, thereby generating vibrations which correspond to the input signal 31 from the signal source 30 that are coupled into the container 200 by the exciters 10. However, the exciters 10 may also be any other device capable of coupling mechanical vibrations into the container 200 and may, in particular, not be directly attached to the container 200. For example, the exciters 10 may also be an acoustic wave source directed at the container 200. However, the preceding descriptions of the exciters 10 are only examples and in principle any other suitable device may be used for the exciters 10.

Oscillations or vibrations from the exciters 10 corresponding to resonance frequencies of the container 200 for the filling level 210 at the moment of the measurement are amplified within the container 200 and create corresponding vibrations within the container 200, while other frequency components are not amplified.

The sensors 20, in turn, are configured to pick up or measure these vibrations of the container 200 and generate corresponding vibration signals 21 that are transmitted to the processor 40. The sensors 20 may be any sensors 20 capable of measuring oscillations or vibrations within the container 200. In the illustrated example embodiment, the sensors 20 are composite fiber strain gauges consisting of an insulating flexible backing made from a composite fiber material which supports a metallic foil pattern. The gauge may be attached to the container 200 (e.g., using a suitable adhesive). When the container 200 vibrates or oscillates, the small deformations of the container 200 deform the metallic foil of the sensors 20, thereby changing the electrical resistance of the sensors 20.

This change of resistance may, for example, be measured using a Wheatstone bridge. Since the vibration of the container 200 comprises certain frequency components, the change of resistance of the fiber strain gauge follows the frequency pattern of the vibrations. However, other suitable sensors may be used, too. For example, the sensors 20 may also be piezoelectric elements attached to the container 200, such as the exciters 10, which generate electrical signals corresponding to the mechanical loads coupled into the piezoelectric element from the container 200.

It should be noted that, although shown and described as having two exciters 10 and eight sensors 20, any other quantity of exciters 10 and sensors may be employed, depending on the specific requirements of a particular application. In general, increasing the quantity of exciters 10 and increasing the quantity of sensors 20 will increase the accuracy of the filling level measurement because more data can be correlated.

The processor 40 may be any computing device for processing signals, such as a general-purpose computer having a CPU and memory components, a microcomputer, an FPGA, an ASIC, an TPU or any combination thereof or any other suitable computing device. The processor 40 receives the vibrations signals 21 from the sensors 20 as well as the input signal 31 from the signal source 30. By comparing the input signal 31 with the vibration signal(s) 21, the processor 40 can extract the resonance frequencies of the container 200 for the corresponding filling level 210. The processor 40 may, for example, perform a spectral or modal analysis by calculating Fast Fourier Transforms (FFTs) of the input signal 31 and the vibration signal 21. By comparing the resulting spectral functions, the resonance frequencies may be easily extracted, as will be readily apparent to one of ordinary skill in the art. For example, the processor 40 may calculate a frequency response function (FRF) from the spectral functions of the input signal 31 and the vibration signal 21. Such a frequency response function is defined as follows:

$$H(f) = \frac{V(f)}{I(f)}$$

Figure 2:
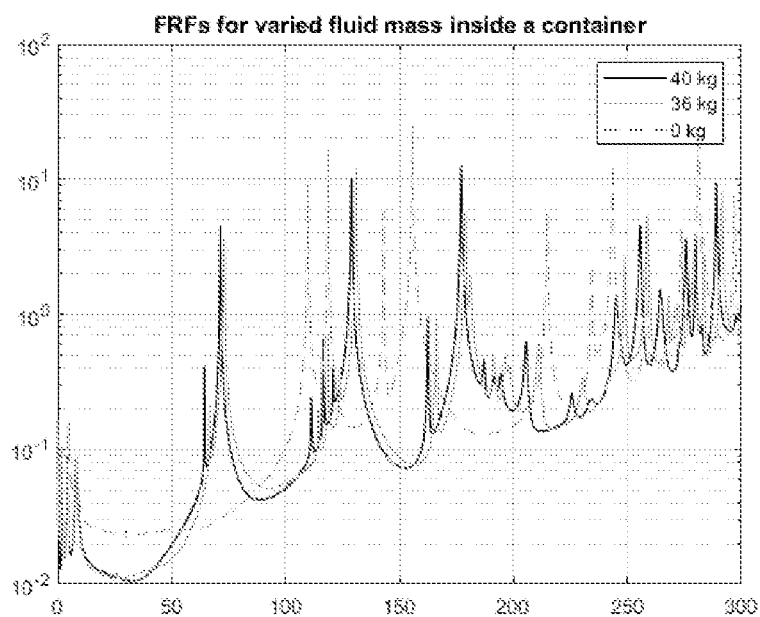
FIG. 2 is an example frequency response function determined for different filling levels of a container of a fluid liquid tank.

In this equation, H(f) is the frequency response function indication for the amplification of the amplitude of certain frequency components over frequency f, V(f) is the vibration signal over frequency (e.g., the FFT of the input signal 31) and I(f) is the input signal over frequency (e.g., the FFT of the vibration signal 21). Since vibrations of the container 200 at corresponding resonance frequencies are amplified, the frequency response function H(f) obtained in this way has local maxima at the resonance frequencies. FIG. 2 shows an example of such an example FRF, as will be described further below. The obtained frequency response function is sent to the filling level indicator 50.

The filling level indicator 50 determines a current filling level 210 of the container 200 by comparing the extracted resonance frequencies (e.g., the FRF from the processor 40) with corresponding resonance frequency patterns known for the container 200 for different filling levels 210. The filling level indicator 50 may, for example, have a stored lookup table of frequency response functions or resonance frequency patterns for different filling levels 210. By correlating the determined FRF (or the extracted resonance frequencies in general) with the stored reference data, a current filling level of the container 200 may be obtained. Since the resonance frequencies of the container 200 also depend on the spatial orientation of the fluid inside the container 200 relative to the spatial orientation of the container 200, as described further above, the spatial orientation and acceleration sensor 60 determines the spatial orientation of the fluid inside the container 200 with regard to the gravity vector and sends corresponding spatial orientation data to the filling level indicator 50. The filling level indicator 50 may use the spatial orientation data to select corresponding reference resonance frequency patterns before comparing the extracted resonance frequencies or resonance frequency pattern with the reference data. For example, reference resonance frequency values may be stored in a multi-dimensional matrix, as already described elsewhere herein, and the filling level indicator 50 may select the corresponding values for the current spatial orientation from this matrix before determining the filling level 210.

Instead of using stored reference data, the filling level indicator 50 may also calculate the corresponding reference data "on-the-fly" by using a computer model of the structural dynamics of the container 200.

After having determined the current filling level 210 of the container 200, the filling level indicator 50 outputs a filling level signal 51 which may, for example, be sent to a control system or display device. In aircraft applications, the filling level signal may be sent to a flight control computer or display device in the cockpit of the aircraft.

FIG. 2 shows an example plot of frequency response functions as described with regard to FIG. 1 that has been obtained during a continuous drain test. In such a continuous drain test, the container 200 of the hydrogen tank 300 is drained in a controlled manner and the frequency response function is determined according to the principles described herein. In FIG. 2, different frequency response functions for different filling levels 210 are shown. It can be seen that the resonance frequencies of the container 200 shift with changing filling level 210 of the container 200. Resonance peaks for four different filling levels 210, namely 100%, 93%, 50% and 0% are indicated. Such reference frequency response functions may be determined beforehand for different spatial orientations of the fluid inside the container 200. The filling level indicator 50 of FIG. 1 may use such frequency response functions determined in a laboratory environment as reference data for determining the filling level 210. However, such reference data may also be calculated by a structural dynamics model, as described above.

Figure 3:
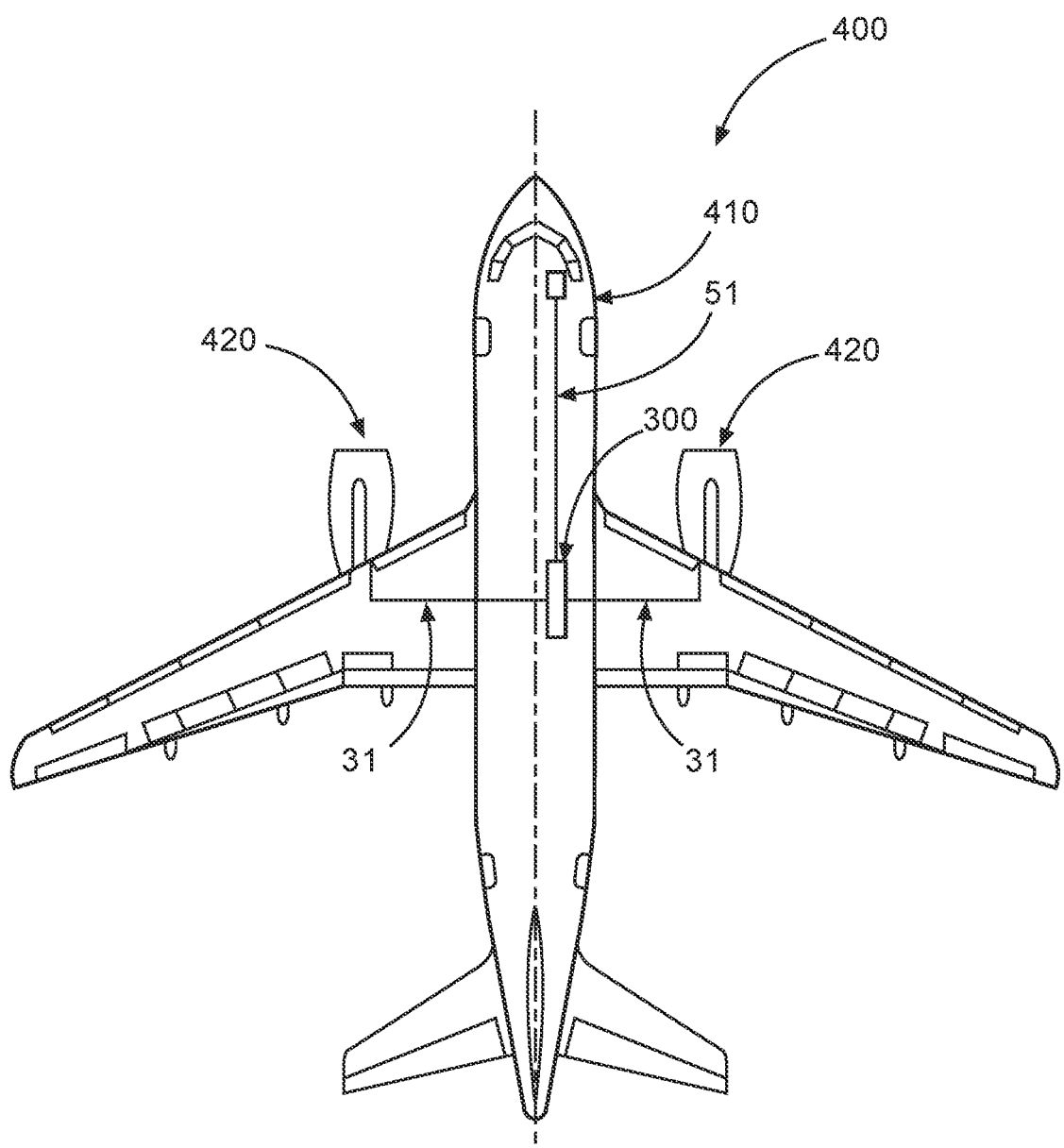
FIG. 3 is a schematic view of an aircraft comprising a hydrogen tank with a filling level monitoring device.

FIG. 3 shows an example embodiment of an aircraft 400 having a fuselage 410 and two turbines 420. The aircraft further comprises a liquid hydrogen tank 300, such as the one described above with regard to FIG. 1. The hydrogen tank 300 serves as a fuel source for the turbines 420. The turbines 420 may either directly burn the hydrogen from the hydrogen tank 300 as primary energy source or may, for example, be an electric turbine using electrical energy created by a fuel cell which consumes hydrogen from the hydrogen tank 300.

In this example embodiment, vibrations of the turbines 420 are directly coupled into the container 200 of the hydrogen tank 300. Therefore, the turbine 420 itself acts as the exciter 10 for the container 200 and couples vibrations into the container 200.

Further, yaw, pitch, and roll sensors of the aircraft itself are connected to the filling level indicator 50 and act as the spatial orientation and acceleration sensor 60 of FIG. 1. The tank is fixed in position within the fuselage 410. In this way, additional spatial orientation and acceleration sensors (e.g., 60, see FIG. 1) are not necessary and the already present sensors within the aircraft 400 can be used. Further, because the turbine 420 itself acts as exciter 10 for the filling level monitoring device 100 of the hydrogen tank 300, additional exciters 10 are not necessary.

By including spatial orientation data of the container 200 into the filling level monitoring device 100, it is possible to accurately monitor the filling level 210 of a hydrogen tank 300 in aircraft applications, in particular during any flight conditions.

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as limitation.

The subject matter disclosed herein can be implemented in or with software in combination with hardware and/or firmware. For example, at least some of the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 exciters
20 sensors
21 vibration signals
30 signal source
31 input signal
40 processing unit
50 filling level indicator
51 filling level signal
60 spatial orientation and acceleration sensor
100 filling level monitoring device
200 container
210 filling level
300 hydrogen tank
400 aircraft
410 fuselage
420 turbine

The invention claimed is:

1. A filling level monitoring device for monitoring a filling level of a fluid in a container, the filling level monitoring device comprising:
   at least one exciter;
   at least one sensor;
   a signal source that is connected to the at least one exciter and is configured to generate an input signal comprising a multitude of frequency components;
   a processor;
   at least one spatial orientation and acceleration sensor; and
   a filling level indicator;
   wherein the at least one spatial orientation and acceleration sensor is connected to the filling level indicator and is configured to measure a spatial orientation of the fluid inside the container;
   wherein the at least one sensor is connected to the processor and is configured to detect vibrations at the container and to generate and send a vibration signal, which corresponds to the detected vibrations, to the processor based on the vibrations detected at the container;

wherein the processor is configured to compare the vibration signal to the input signal to extract resonance frequencies;

wherein the filling level indicator is configured to:
receive the extracted resonance frequencies from the processor;
receive a spatial orientation measurement of the fluid inside the container from the at least one spatial orientation and acceleration sensor; and
determine a current filling level of the container based on the extracted resonance frequencies and the spatial orientation of the fluid inside the container.

2. The filling level monitoring device of claim 1, wherein:
the at least one spatial orientation and acceleration sensor comprises:
a first sensor configured for measuring a pitch angle;
a second sensor configured for measuring a yaw angle;
a third sensor configured for measuring a roll angle; and
a fourth sensor configured for measuring an acceleration in each spatial orientation axis of the container; and
the spatial orientation is defined with regard to the pitch angle, the yaw angle, the roll angle, and the acceleration with regard to each spatial orientation.

3. The filling level monitoring device of claim 1, wherein the at least one sensor is configured for measuring vibrational dynamics of the container at a location of the at least one sensor.

4. The filling level monitoring device of claim 1, wherein the at least one exciter is configured for attachment to the container and to couple vibrational loads corresponding to the input signal from the signal source into the container.

5. The filling level monitoring device of claim 1, wherein the signal source is configured to generate a signal suitable to obtain a frequency response function (FRF) in a desired frequency range as the input signal.

6. The filling level monitoring device of claim 1, comprising a display, wherein the filling level indicator is configured to transmit a filling level signal to the display.

7. The filling level monitoring device of claim 1, wherein the filling level indicator is configured to transmit a filling level signal to a flight control computer of an aircraft.

8. The filling level monitoring device of claim 1, wherein the processor is configured to compare the vibration signal to the input signal by calculating a Fast Fourier Transform (FFT) of each of the vibration signal and the input signal and by comparing the FFT of the vibration signal with the FFT of the input signal.

9. The filling level monitoring device of claim 8, wherein the processor is configured to extract the resonance frequencies by calculating a frequency response function (FRF) of the vibration signal with regard to the input signal using the FFT of the vibration signal and the FFT of the input signal, thereby obtaining a pattern of resonance frequencies.

10. The filling level monitoring device of claim 9, wherein the filling level indicator is configured to determine the current filling level of the container based on the resonance frequencies extracted or FRFs by machine learning and artificial intelligence methods trained with calibrated patterns of resonance frequencies or FRFs using the pattern of resonance frequencies obtained or FRFs as an input.

11. The filling level monitoring device of claim 9, wherein the filling level indicator is configured to determine the current filling level of the container based on the resonance frequencies extracted or FRFs by correlating the pattern of resonance frequencies obtained or FRFs with calibrated patterns of resonance frequencies.

12. The filling level monitoring device of claim 11, wherein:
the calibrated patterns of resonance frequencies or FRFs comprise calibrated patterns of resonance frequencies or FRFs for different spatial orientations of the fluid inside the container; and
the filling level indicator is configured for training by machine learning and artificial intelligence methods with the calibrated patterns of resonance frequencies or FRFs and the obtained pattern of resonance frequencies or FRF as an input to select calibrated patterns of resonance frequencies corresponding to a current spatial orientation of the fluid inside the container prior to determining the current filling level of the container.

13. The filling level monitoring device of claim 11, wherein:
the calibrated patterns of resonance frequencies or FRFs comprise calibrated patterns of resonance frequencies or FRFs for different spatial orientations of the fluid inside the container; and
the filling level indicator is configured to select calibrated patterns of resonance frequencies or FRFs corresponding to a current spatial orientation of the fluid inside the container prior to determining the current filling level of the container.

14. A hydrogen tank comprising:
a container for holding liquified hydrogen; and
at least one filling level monitoring device according to claim 1.

15. An aircraft comprising:
an aircraft fuselage;
an aircraft turbine; and
at least one hydrogen tank according to claim 14;
wherein the hydrogen tank is fixed in position with respect to the aircraft fuselage; and
wherein the at least one spatial orientation and acceleration sensor is a spatial orientation and acceleration sensor of the aircraft itself.

16. The aircraft of claim 15, wherein the filling level monitoring device is configured to monitor a filling level of the liquified hydrogen in the container.

17. The aircraft of claim 15, wherein the signal source of the filling level measurement device is a source of vibrations onboard the aircraft suitable for use in exciting the container in a desired frequency range.

* * * * *